United States Patent
Klein et al.

(10) Patent No.: US 7,720,500 B2
(45) Date of Patent: *May 18, 2010

(54) TRANSMIT POWER CONTROL FOR MOBILE UNIT

(75) Inventors: John Klein, Morgan Hill, CA (US); Richard Montgomery, Saratoga, CA (US); Dong Nguyen, Sunnyvale, CA (US); Andrew Werback, San Jose, CA (US); William Kellogg, San Jose, CA (US); Wayne Ouchida, Mountain View, CA (US); Graham Melville, Morgan Hill, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/516,975

(22) Filed: Sep. 7, 2006

(65) Prior Publication Data

US 2007/0004444 A1 Jan. 4, 2007

Related U.S. Application Data

(63) Continuation of application No. 09/996,514, filed on Nov. 28, 2001, now Pat. No. 7,174,134.

(51) Int. Cl.
*H04B 7/00* (2006.01)

(52) U.S. Cl. .................................. 455/522; 455/422.1

(58) Field of Classification Search .................. 455/69, 455/522, 443, 444, 436, 432.1, 429, 422.1
See application file for complete search history.

(56) References Cited

U.S. PATENT DOCUMENTS

| | | | |
|---|---|---|---|
| 7,308,279 B1 * | 12/2007 | Zweig | 455/522 |
| 2002/0018008 A1 * | 2/2002 | Wright et al. | 340/945 |
| 2002/0131376 A1 * | 9/2002 | Wheatley et al. | 370/328 |
| 2002/0168993 A1 * | 11/2002 | Choi et al. | 455/522 |

* cited by examiner

*Primary Examiner*—Tu X Nguyen

(57) ABSTRACT

In a wireless local area network which includes access point having variable transmitter power levels, transmitter power data is sent from the access points to the mobile units and used by the mobile units in order to provide a corresponding variation in the transmitter power of the mobile unit.

4 Claims, 2 Drawing Sheets

TRANSMIT POWER CONTROL FOR MOBILE UNIT

CROSS REFERENCE TO RELATED APPLICATION

This application is a continuation of U.S. patent application Ser. No. 09/996,514 filed Nov. 28, 2001 now U.S. Pat. No. 7,174,134, which is incorporated by reference herein in its entirety.

BACKGROUND OF THE INVENTION

This invention relates to wireless local area networks (WLAN) and particularly, to avoidance of radio interference in such networks. As data rates of WLAN systems increase, more access points are required and the effective range of a higher data rate signals between the access point and mobile units is reduced. In order to provide sufficient high bandwidth connectivity for mobile units, the density of access point population is increased, particularly, in areas in which a high number of mobile units are anticipated. The close distribution of access points is sometimes referred to as micro-cell distribution. As the distance between access points is reduced, RF interference between access points can increase. One technique for controlling such interference is reduce the transmit power output of the access points, to thereby reduce their range and reduce interference.

Interference can also exist between transmissions of mobile units. It is difficult, however, to generally reduce the power output of mobile units, because the mobile unit may sometimes be used in an area where there is a high density of access points, and accordingly, only a lower transmittal power is required, and also the same mobile units may roam into an area in which access points are spaced at further distances, and the full power of the mobile unit is required to effectively transmit to the access points.

It is an object of the present invention to provide a method and apparatus for controlling the transmit power level of a mobile unit in accordance with the environment encountered by the multiple unit.

SUMMARY OF THE INVENTION

In accordance with the invention, there is provided a method for use in a wireless local area network, wherein mobile units receive beacon signals from access points and associate with access points for data communication therewith. The method is for controlling transmitter power level of a mobile unit. Data representing transmitter power level for an access point is transmitted from the access point to the mobile unit. The mobile unit receives the access point transmitter power level data and adjusts the power level of the mobile unit transmitter in accordance with the value of the access point transmitter power level.

The power adjustment of the made mobile unit, may comprise setting the mobile unit power level to a power level corresponding to the power level of the access point as represented by the access point power level data. Alternatively, the power level of the mobile unit may be set to a level which is a selected amount greater than the access power level data. In one arrangement, the access point power level data is transmitted as part of the beacon signal. The adjustment of the power level of the mobile unit is advantageously performed when the mobile unit associates with an access point.

In accordance with the invention, there is provided a mobile unit for use in a wireless local area network having access points transmitting at different power levels. The mobile unit includes a receiver for receiving data signals from the access point and a transmitter responsive to transmitter power level signals to transmit at a selected power level corresponding to the power level signals. The mobile unit further includes a processor coupled to receive data signals from the receiver and programmed to derive power level data from signals received from the access points and to provide corresponding power level signals to the transmitter.

In a preferred arrangement, the processor is further programmed to provide maximum power level signals to the transmitter when it fails to derive power level data from the received AP signals.

In accordance with the invention, there is provided a method for controlling interference in a wireless local area network having access points and mobile units. Access points are provided with adjustable transmitter power level and distributed over an area with varying spacing between access point. The transmitter power of the access points is manually adjusted according to the access point spacing, wherein access points with greater spacing have greater transmitter power. Power level data representing transmitter power of the access points is transmitted from each of the points in every 802.11 beacon. Mobile units are provided having transmitters responsive to power level signals for adjusting transmitter power of the mobile units. Power level data transmitted by the access points is received by the mobile units which provide power level signals corresponding thereto to the mobile unit transmitters.

In a preferred arrangement, the power level data signals from the AP represent the same power level as the power level data for the MU, or alternatively, a power level incrementally greater than the power level represented by the power level data. In a system wherein, the access points transmit beacon signals for use by mobile units to associate with the access points, the power level data can be transmitted within the beacon signals. Preferably the power level signals are providing to the mobile unit transmitter while the mobile unit is within range of the associated access point. Where the mobile unit does not receive power level data from the associated access point, a maximum power level data signals can be provided to the mobile unit transmitter.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

The FIG. 1 is an area map showing the distribution of access points having fixed and/or variable transmitter power and mobile units for communicating therewith.

DESCRIPTION OF THE INVENTION

Figure 1:
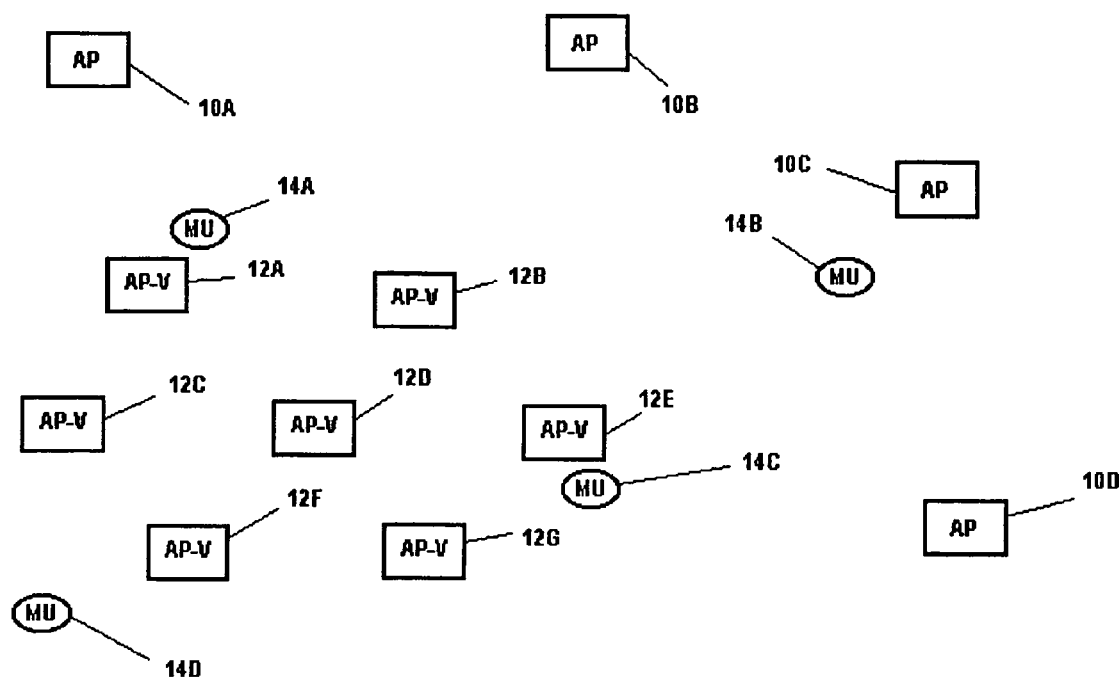

Referring to FIG. 1, there is shown a map illustrating exemplary locations of fixed power access points 10A through 10E, variable power access points 12A through 12G and mobile units 14A through 14E in a wireless local area network. In the network illustrated in FIG. 1, access points 10A through 10E may have fixed transmitter power and are arranged at a wider spacing between adjacent access points, which is selected according to the transmitter power, and hence the range of each access point 10. Variable power access points 12A through 12G are provided in a central area, wherein a greater volume of data traffic may be anticipated. For example, variable power access points 12A through 12G may be provided for servicing mobile units within a central laboratory area of an industrial complex, wherein a high volume of data transmission might be anticipated, while access points 10A through 10E may be provided in peripheral areas, wherein a smaller number of mobile units, and hence a lower volume of data traffic may be anticipated.

In the system illustrated in FIG. 1, since variable power access points 12 are arranged with a closer spacing between access points, and hence a greater access points population, it can be anticipated that signals from access points, such as access point 12A, may interfere with signals from the adjacent and second adjacent access points, some of which may be operating in the same frequency band. In order to reduce such radio interference, or the existence of radio frequency noise in the communication channel, the transmitter power of access points 12 is variable such that the power level of the access points 12 can be set at a value that is reduced according to the reduced spacing of the access points. Fixed transmitter power access points 10, which may also be variable power access points set at maximum power, transmit a greater power level because of the greater distance between access points and the likelihood that reduced transmitter power will cause coverage gaps in the wireless local area network.

While it is clearly possible to vary the transmitter power of the variable power access points 12, according to the spacing between access points to provide effective local area network coverage, the fact that mobile units 14 can roam within any area of the wireless local area network, and hence be at a position which is widely spaced from the nearest access point with which it associates, it is not possible to adjust the transmitter power of the mobile units based their location, since their location is not fixed.

In accordance with the method of the present invention, the variable power access points 12 transmit power level data to their associated mobile units, which indicates to the associated or potentially associated mobile units, the power level at which the access point is transmitting. Mobile units 14 receive the power level data from the access points and are arranged to adjust the power level of their own transmitters to correspond to the power level being transmitted by the access point with which the mobile unit is or becomes associated. In the event, the mobile unit, such as mobile unit 14E is associated or becomes associated with a fixed power access point 10E, of conventional design, it does not receive a power level data from the access point. In this event, the transmitter of mobile unit 14E is set to the maximum power level setting.

Figure 2:
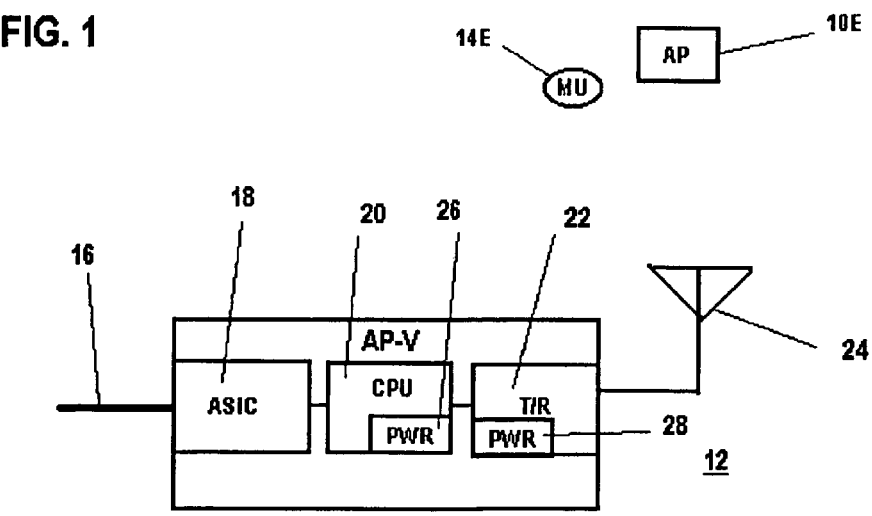
FIG. 2 is a block diagram of a variable transmitter power access point.
Figure 3:
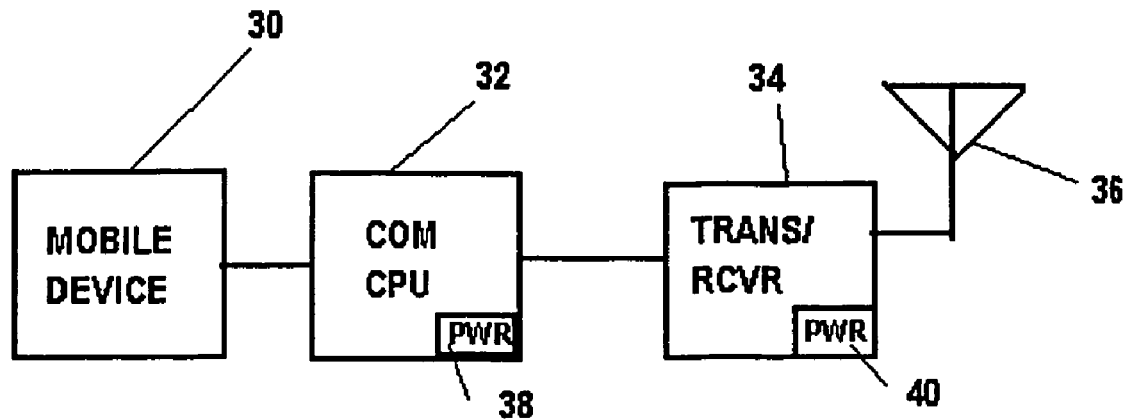
FIG. 3 is a block diagram of a variable transmitter power mobile unit in accordance with the present invention.

FIG. 2 is a block diagram of an exemplary embodiment of a variable access point 12. Access point 12 includes an asynchronous interface controller 18 which sends and receives signals over cable 16 which is connected to, for example, a central computer or a wired data communications network. A central processing unit 20 in access point 12 controls the operation of the access point to transmit and receive signals and to control the operation of access point 12 in connection with association of mobile units therewith. A transmitter/receiver 22 is provided for sending and receiving wireless data communications signals using antenna 24. In connection with the variable power access point 12, the transmitter power level of the access point is controlled, for example, by providing power level data 26 in an allocated memory location of CPU 20. The power level data 26 is transferred to a register 28 in the transmitter/receiver 22 whereat it is used to control the power level of the access point during transmission. When the wireless local area network illustrated, for example, in FIG. 1 is installed and tested, the power level data 26 can be provided at each access point 12 in accordance with the spacing of the access points and the signal level of the access points as observed by testing instruments within the area covered. The variation of power level 26 may be affected, for example, by a control signal provided by a central processor over the wired network cable 16, or alternately the power level can be set by connecting a control unit to the access point directly and providing the power level as a control signal for CPU 20, for example, through a serial port thereof. In connection with the testing of the operation of the WLAN, the power level data 26 maybe changed or adjusted, as appropriate, for propagation conditions that are observed. In accordance with the method of the present invention, the transmitter power level of mobile units 14 is adjusted in accordance with the power level set by the power level data 26 of the access point transmitters with which the mobile units are associated or about to become associated. For example, if the WLAN of FIG. 1 is a network operating in accordance with IEEE standard 802.11, the access points 10 and 12 transmit beacon signals which are used by mobile units 14 to request association. The mobile units 14 receive beacon signals from nearby access points and observe signal level thereof. The beacon signals optionally include data signals which can be used by the mobile units in connection with the association process. Assuming mobile unit 14C of FIG. 1 receives the strongest beacon signal from variable power access point 12E, mobile unit 14C additionally receives within the beacon signal, data representing the power level 26 at which variable power access point 12E has been set. CPU 20 adds this power level data to the transmitted beacon signal. Referring to FIG. 3, mobile unit 14 includes a mobile device 30, such as a PDA, a notebook computer or a telephone, a communication controller 32, which may be a digital signal processor or a microcomputer, and a transmitter/receiver 34, which transmits and receives radio frequency data communication signals via antenna 36. Transmitter/receiver 34 is arranged to transmit a transmitter power level which is set forth in a register 40 within the transmitter receiver.

Mobile unit 14 receives a beacon signal from an access point 12 which includes transmitter power data transmitted by the access point 12 as part of the beacon. The transmitter power level data is extracted from the received signal in CPU 32 and set forth in a register 38 in CPU 32. This power level data is used to provide transmitter power level signals to a register 40 in transmitter/receiver 34 in the mobile unit 14. In one example, the transmitter power level signals may represent the same transmitter power which is represented by the power level data signals received from the access point. Alternately, since the mobile units 14 experience a variety of environmental or multipath conditions, the power level signals provided to the transmitter 34 of the mobile unit 14 may represent a transmitted power level that is greater, for example, 1 or 2 incremental values greater, than the transmitter power represented by the power level data signal received from the access point 12.

In a preferred arrangement, CPU 32 is arranged to set the power level signals 40 provided to transmitter 34 at a maximum value when no power level data is received from the access point, for example, when the access point is not a variable power access point such, as access point 10C of FIG. 1.

Figure 4:
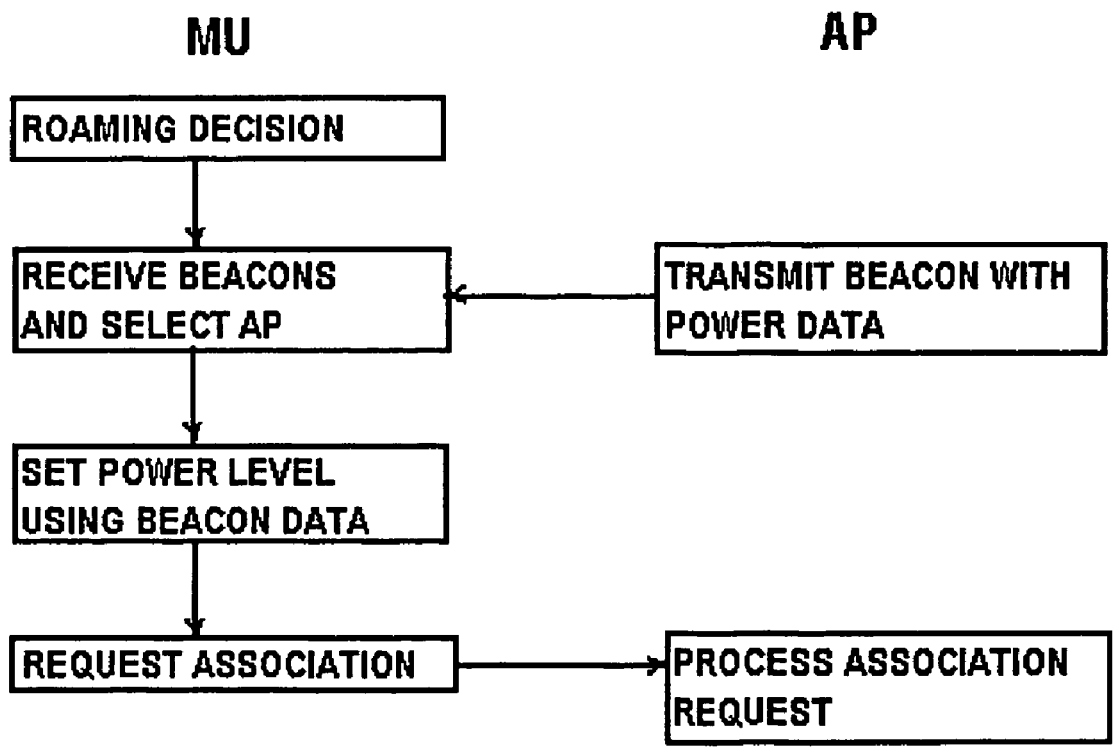
FIG. 4 is a flow diagram illustrating one embodiment of the method of the present invention.

FIG. 4 is a flow diagram illustrating the method of controlling power of the mobile units 14 in accordance with one embodiment of the present invention. As shown in FIG. 4, when the mobile unit makes a decision for roaming, such as upon initial initiation of operation, or when signal levels received from an associated access point vary on account of movement of the mobile unit, the mobile unit receives beacon signals and selects an access point with which to attempt association. The access point sends the beacon signal with power data which is thereafter extracted from the beacon data by the mobile unit. The power level of the mobile unit is set using the power level data received as part of the beacon signals, and provided as a power level signal to the transmitter 34 of the mobile unit. The mobile unit 14 thereafter requests association with the access point and the access point processes the association request. Thereafter, during data communication between the mobile unit and the associated access point, the transmitted power of the mobile unit is set by the power level signal provided to transmitter 34 by CPU 32 and corresponds to the power level data sent by the access point to the mobile unit. This power level is set to the same or slightly greater power level than the power level represented by the power level data previously been set by the access point, as described above.

While there have been described what are believed to be the preferred embodiments of the present invention, those skilled in the art will recognize that other and further modifications and changes may be made thereto without departing from the spirit of the invention and it is intended to claim all such changes and modifications as fall within the true scope of the invention.

The invention claimed is:

1. A method for controlling interference in a wireless local area network having access points and mobile units, comprising:
   providing access points including access points with adjustable transmitter power level and distributing said access points over an area with varying spacing between access points;
   adjusting the transmitter power of said adjustable transmitter power level access points according to said access point spacing, wherein access points with greater spacing have greater transmitter power in operation;
   providing access points power level data representing transmitter powers of said adjustable power level access points in operation, and transmitting said access points power level data from each of said adjustable power level access points;
   providing mobile units having transmitters responsive to power level signals for adjusting transmitter power of said mobile units;
   receiving said access points power level data representing transmitter powers of said adjustable power level access points in operation at said mobile units and
   providing power level signals corresponding thereto to said mobile unit transmitters, wherein said access points transmit beacon signals for use by mobile units to associate with one of said access points, and wherein said access points power level data representing transmitter powers of said adjustable power level access points in operation is transmitted within said beacon signals.

2. A method according to claim 1, wherein adjusting power level of said mobile units comprises setting said mobile unit to a power level corresponding to said access point transmitter power level data.

3. A method according to claim 1, wherein said adjusting power level of said mobile units is performed when said mobile unit associates with an access point.

4. The method according to claim 1 wherein providing power level signals corresponding thereto to said mobile unit transmitters comprises providing a power level signal to a mobile unit transmitter while a mobile unit is associating with an access point.

* * * * *